(12) United States Patent
Frivik et al.

(10) Patent No.: US 8,634,270 B2
(45) Date of Patent: Jan. 21, 2014

(54) DETERMINING SEA CONDITIONS IN MARINE SEISMIC SPREADS

(75) Inventors: Svein Arne Frivik, Oslo (NO); Nicolas Goujon, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 342 days.

(21) Appl. No.: 12/896,508

(22) Filed: Oct. 1, 2010

(65) Prior Publication Data
US 2012/0081996 A1 Apr. 5, 2012

(51) Int. Cl.
*G01V 1/38* (2006.01)

(52) U.S. Cl.
USPC .............................. 367/19; 367/20; 367/154

(58) Field of Classification Search
USPC ...................... 367/15–24, 153, 154
See application file for complete search history.

(56) References Cited

U.S. PATENT DOCUMENTS

| | | | |
|---|---|---|---|
| 3,375,715 A * | 4/1968 | Hodges et al. ................. | 367/114 |
| 5,077,700 A | 12/1991 | Shaw et al. | |
| 5,351,218 A | 9/1994 | Hatteland et al. | |
| 5,623,524 A * | 4/1997 | Weiss et al. ..................... | 367/99 |
| 6,529,445 B1 * | 3/2003 | Laws ............................ | 367/151 |
| 6,684,160 B1 | 1/2004 | Ozbek et al. | |
| 7,068,568 B2 * | 6/2006 | Robertsson ..................... | 367/24 |
| 7,161,871 B2 | 1/2007 | Brunet | |
| 7,376,045 B2 * | 5/2008 | Falkenberg et al. ............ | 367/19 |
| 7,379,387 B2 | 5/2008 | Strong et al. | |
| 7,400,552 B2 | 7/2008 | Moldoveanu et al. | |
| 7,426,439 B2 | 9/2008 | Ozdemir et al. | |
| 7,466,625 B2 | 12/2008 | Robertsson et al. | |
| 7,944,774 B2 * | 5/2011 | Monk et al. ..................... | 367/21 |
| 2005/0073909 A1 * | 4/2005 | Laws et al. ...................... | 367/15 |
| 2006/0246654 A1 | 11/2006 | Shin | |
| 2006/0256653 A1 * | 11/2006 | Toennessen et al. ............ | 367/16 |
| 2007/0025182 A1 | 2/2007 | Robertsson | |
| 2008/0008037 A1 | 1/2008 | Welker | |
| 2008/0049551 A1 | 2/2008 | Muyezert et al. | |
| 2008/0144442 A1 | 6/2008 | Combee et al. | |
| 2008/0165618 A1 | 7/2008 | Robertsson | |
| 2008/0186804 A1 | 8/2008 | Amundsen et al. | |
| 2008/0267010 A1 | 10/2008 | Moldoveanu | |
| 2008/0275649 A1 | 11/2008 | Ozdemir et al. | |
| 2008/0289433 A1 | 11/2008 | Lohrmann et al. | |
| 2009/0003132 A1 | 1/2009 | Vassallo et al. | |

(Continued)

FOREIGN PATENT DOCUMENTS

| | | |
|---|---|---|
| GB | 2363459 A | 12/2001 |
| WO | 03100461 A2 | 12/2003 |

OTHER PUBLICATIONS

International Search Report and Written Opinion of PCT Application No. PCT/US2011/052088 dated Apr. 16, 2012: pp. 1-11.

(Continued)

*Primary Examiner* — Ian J Lobo

(57) ABSTRACT

According to one or more aspects of the invention, a marine seismic survey method comprises towing at least two streamers below a sea surface forming a survey spread, each streamer comprising a survey sensor and a profiler; and at each profiler, emitting an acoustic signal; recording an echo of the emitted signal at the profiler; and determining a parameter from the recorded echo, the parameter comprising at least one selected from the group of a distance between the profiler and the sea surface, a water current vector and a sea surface slope.

15 Claims, 5 Drawing Sheets

(56) References Cited

U.S. PATENT DOCUMENTS

| | | |
|---|---|---|
| 2009/0067285 A1 | 3/2009 | Robertsson et al. |
| 2009/0141587 A1 | 6/2009 | Welker et al. |
| 2009/0161485 A1* | 6/2009 | Toennessen et al. ............ 367/16 |
| 2009/0296520 A1 | 12/2009 | Keers et al. |
| 2010/0118644 A1* | 5/2010 | Seale et al. ...................... 367/16 |

OTHER PUBLICATIONS

Anonymous, "Vessel-mounted Current Profiler," Nortek AS, 2007: pp. 1-4.

Robertsson et al., "Rough Sea Deghosting Using a Single Streamer and a Pressure Gradient Approximation," Nov. 2002, vol. 67(6): pp. 2005-2011.

* cited by examiner

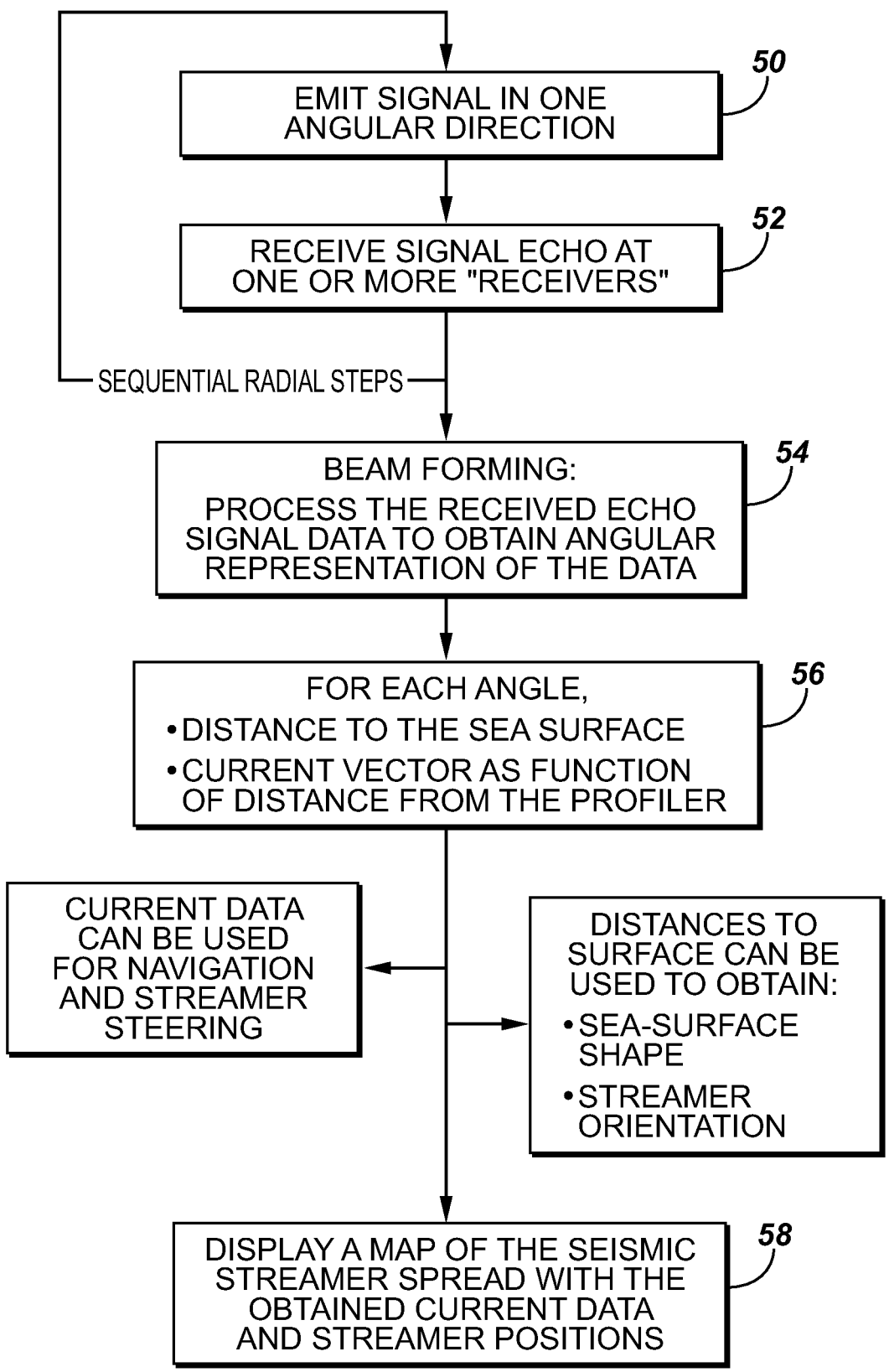

DETERMINING SEA CONDITIONS IN MARINE SEISMIC SPREADS

TECHNICAL FIELD

The invention relates in general to marine seismic operations and more specifically to methods and devices for obtaining data regarding sea conditions to promote deghosting of acquired seismic data and/or streamer steering.

BACKGROUND

This section of this document is intended to introduce various aspects of art that may be related to various aspects of the invention described and/or claimed below. This section provides background information to facilitate a better understanding of the various aspects of the invention. It should be understood that the statements in this section of this document are to be read in this light, and not as admissions of prior art.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

A marine seismic survey system according to one or more aspects of the invention comprises a streamer positioned below a sea surface, the streamer having survey sensors; a survey source; and a profiler emitting an acoustic signal from the profiler and the profiler recording an echo of the emitted signal, wherein the echo is indicative of a survey parameter.

A method for determining a water parameter according to one or more aspects of the invention comprises emitting an acoustic signal from a location positioned below a sea surface; recording an echo of the emitted signal at the location; and determining a parameter from the recorded echo, the parameter comprising at least one selected from the group of a distance from the profiler to the sea surface, a water current velocity and a slope of the sea surface.

According to one or more aspects of the invention, a marine seismic survey method comprises towing at least two streamers below a sea surface forming a survey spread, each streamer comprising a survey sensor and a profiler; and at each profiler, emitting an acoustic signal; recording an echo of the emitted signal at the profiler; and determining a parameter from the recorded echo, the parameter comprising at least one selected from the group of a distance between the profiler and the sea surface, a water current vector and a sea surface slope.

The foregoing has outlined some of the features and technical advantages of the invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the invention will be best understood with reference to the following detailed description of a specific embodiment of the invention, when read in conjunction with the accompanying drawings, wherein:

FIG. 7 is a block diagram of another illustrative embodiment of a method of obtaining, and utilizing, marine seismic survey data.

DETAILED DESCRIPTION

Figure 1:
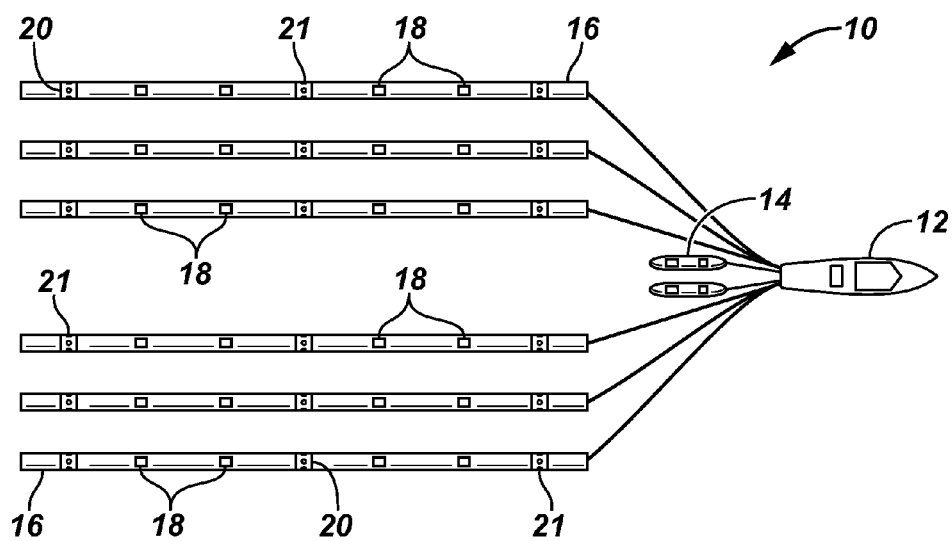
FIG. 1 is a plan view of an illustrative embodiment of a marine seismic survey system according to one or more aspects of the invention.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Reference is made to a towed marine seismic survey, where one or several streamers are towed behind a vessel with one or more sources towed behind the same and/or another vessel. The seismic streamers may be several thousand meters long and contain a large number of sensors, which are distributed along the length of the each seismic streamer cable. Reference may be made to the in-line direction as the direction in the horizontal plane parallel to the streamer(s). A Cartesian coordinate system will also be used where the in-line direction is referred to as the x-direction. Conversely, the cross-line direction may be referred to as the direction in the horizontal plane perpendicular to the streamer(s). In the Cartesian coordinate system, the cross-line direction is referred to as the y-direction.

The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits. Similarly, electromagnetic (EM) surveying can use EM sources and receivers. One type of EM surveying is referred to as controlled source EM surveying (CSEM), in which an EM transmitter is used to generate EM signals that are propagated into the subterranean structure. Subterranean elements reflect the EM signals, with the reflected EM signals received by the EM receivers.

For the case of multi-component seismic sensors, each sensor may be capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components of a particle velocity and one or more components of a particle acceleration. An example of a commercial multi-component system designed for ocean-bottom (also known as seabed) applications is WesternGeco's Q-SEABED system.

Depending on the particular embodiment, the multi-component seismic sensor may include one or more hydrophones, geophones, particle displacement sensors, particle velocity sensors, accelerometers, pressure gradient sensors, or combinations thereof. For example, in accordance with some embodiments, a particular multi-component seismic sensor may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices, depending on the particular embodiment. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

As the streamers are towed behind the survey vessel, acoustic signals, commonly referred to as "shots," produced by the seismic source are directed down through the water column into strata, beneath a water bottom surface, where they are reflected from the various subterranean geological formations travel back to sea surface (up-going wave). One well known problem in marine seismic is that, up-going waves are reflected once more at the sea surface because of the air-water interface. Hence the sensors in the seismic streamer cable record not only the desired wavefield (up-going wave, i.e., reflected signal from various subterranean geological formations) but also their reflections from the sea surface (down-going wave) because of the air-water interface. This undesired term is known as "ghost" in the art. Depending on the incidence angle of the up-going wavefield and depth of the streamer cable, the interference between the up-going and down-going wavefields create nulls or notches in the recorded spectrum. These notches reduce the useful bandwidth of the spectrum and limits the possibility of towing the streamer in deep water (e.g., at 20 m).

The process of decomposing the recorded wavefield into up- and down-going components is known as wavefield separation or deghosting in the literature. It is known that, to this purpose, particle velocity sensors can be incorporated into the streamer in addition to the pressure sensors. Then by combining the pressure and particle velocity measurements, the "ghost" free data, known as up-going wavefield can be calculated. In the case of vertical incidence, the standard method to do the wavefield separation is to add and subtract a scaled version of the vertical component of the particle velocity measurement to and from pressure measurement. This standard technique is known as PZ-summation in the literature.

In many of the deghosting solutions proposed to date (e.g.: Robertsson, J. O. A., Kragh, J. E., and Martin, J., 1999, Method and system for reducing the effects of the sea surface ghost contamination in seismic data, GB Patent No. 2,363, 459; Robertsson, J. O. A., and Kragh, J. E., 2002, Rough sea deghosting using a single streamer and a pressure gradient approximation, Geophysics, 67, 2005-2011; and Robertsson, J. O. A., Amundsen, L., Roesten, T., and Kragh, J. E., 2003, Rough-sea deghosting of seismic data using vertical particle velocity approximations, International Publication No. WO 2003/100461, all of which are incorporated herein by reference), three-dimensional ("3-D") effects are ignored. Data are assumed to be acquired with a source event, or "shot," occurring in-line with a streamer, or otherwise to be pre-processed to satisfy this criterion.

However, in reality, 3-D effects may be significant for several different reasons, such as by example, (a) the acquisition geometry is 3-D with significant cross-line offsets between some of the streamers and the source(s); (b) a 2-D approach assumes cylindrical spreading of a wave front in space, whereas in 3-D it is assumed to be spherical; (c) the sea surface has a 3-D structure causing scattering out-of-plane; and (d) there may be significant cross-line variation in the sub-surface causing out-of-plane reflections and scattering. Various systems and methods for 3-D deghosting have been disclosed, including U.S. Patent Application Publication Nos. 2009/0067285, 2008/0275649, 2008/0165618, and 2008/0049551, all of which are incorporated herein by reference.

Some of the deghosting methods use only hydrophone data and some utilize data from hydrophones with particle motion sensors, for example, only vertical motion (e.g., Vz for PZ Summation) or three axis of particle motion. Some of these methods need accurate information on the streamer depth and some of the methods need information on the sea-surface shape. As noted above, the time delay between the up- and down-going waves of the pressure wavefield depends on the distance between the streamer and the sea surface at or close to the sensor position, or local streamer depth (e.g., the average streamer depth plus the height of the sea waves above the streamer); and the amplitude and the shape of the down-going wave (e.g., ghost) depends on the sea surface shape.

FIG. 1 is a plan view of an illustrative embodiment of a marine seismic survey system of the invention generally denoted by the numeral 10. The depicted system 10 includes a vessel 12 towing one or more survey acoustic sources 14 and streamers 16 that carry survey sensors 18. Streamers 16 may be several kilometers long and form streamer or survey spreads of tens of square kilometers. The "spread" is utilized herein to identify, without limitation, the area encompassed by the length and the width of the streamers.

Some examples of marine survey systems that may be utilized in whole or in-part are disclosed in: U.S. patent application Ser. No. 12/132,592; U.S. Pat. Nos. 7,466,625; 7,426,439; 7,400,552; 6,684,160 and 5,351,218; and U.S. Patent Application Publication Nos. 2009/0141587; 2009/0003132; 2008/0267010; 2008/0186804; 2008/0144442; 2008/0008037; 2007/0025182 and 2006/0246654; all of which are incorporated herein by reference. One type of EM surveying is referred to as controlled source EM surveying (CSEM), in which an EM transmitter (e.g., source) is used to generate EM signals, with the reflected EM signals received by the EM receivers.

System 10 further includes a plurality of profilers 20 dispersed throughout the streamer spread. In the illustrated embodiment, profilers 20 are mounted on streamer 16. Profilers 20 may be provided in various locations comprising, without limitation, streamers 16 and on or proximate to sources 14. Profilers 20 may utilize, for example Doppler technology, to obtain data such as the depth (e.g., vertical distance below the sea surface) of the profiler, and thus the streamer, below the sea surface, non-vertical distance from profilers 20 to the sea surface, incident angles relative to the sea surface and the streamer, the slope (e.g., gradient) of the sea surface, water current data and the like. System 10 can transform the data obtained by profilers 20 to provide information and/or signals to maneuver vessel 12 and the towed streamers 16 as well as to provide additional data and information for interpretation of the obtained seismic data (e.g., deghosting).

Figure 2:
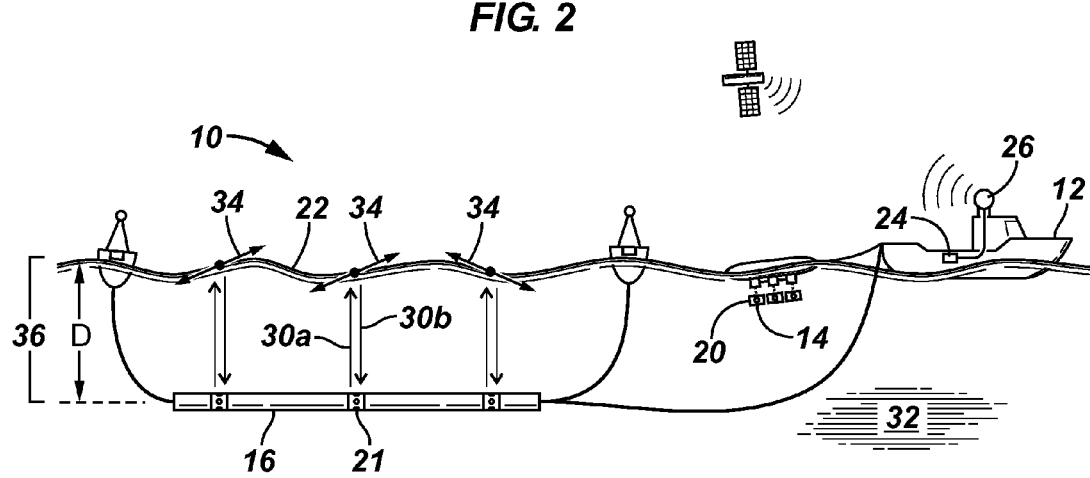
FIG. 2 is an elevation view of illustrative embodiment of a marine seismic system according to one or more aspects of the invention.

Refer now to FIG. 2 depicting an elevation view of an illustrative embodiment of system 10. Streamer 16 is shown being towed below sea surface 22. The distance between components (e.g., streamer 16, profilers 20) and sea surface 22 are denoted generally by the character "D". As will be understood by those skilled in the art with the benefit of the disclosure, distance "D" can be utilized to refer to various distances relative to the sea surface. For example, and without limitation, distance "D" can be utilized to describe the vertical distance, or depth, between a component and the sea surface, average depth (e.g., vertical distance) of one or more streamers 16, the local depth (e.g., vertical distance) of a component to the sea surface, as well as non-vertical distances "D" to the sea surface.

In this illustrative embodiment, streamer 16 and one or more of sources 14 includes a profiler 20. Profiler 20 can include a processor 24 that is positioned at profiler 20 or remote from profiler 20. Only one processor 24 is depicted in FIG. 2, however, one or more processors 24 can be included as further described herein. The spacing, or density, of profilers 20 may be determined based on the survey system and the amount of information desired or needed. For example, in multi-component streamer systems that use PZ summation to remove the surface ghost it is more important to have streamer depth information than it is in a hydrophone streamer. Thus, it may be desired to reduce the spacing between profilers 20 and thereby increase the density of the profilers in a multi-component system relative to hydrophone streamers. Communications between processor(s) 24 and profilers 20, output device 26, personnel and the like may be made through physical cables and/or wireless communications.

System 10 may include one or more processors 24. One or more processors 24 may be utilized and be disposed along streamer 16, at the tail buoys, on vessel 12, and/or at another remote location. Processors 24 can be utilized to transform the echo data received at profilers 20 into a survey parameter such as, and without limitation to, depth (e.g., vertical distance) of components below sea surface 22, non-vertical distances between sea surface 22 and components (e.g., streamer 16, profilers 20), the slope (e.g., gradient) 34 of the sea surface, incident angles relative to components and the sea surface, the water current at sea surface 22 as well as proximate to and below sea surface 22, and the sea surface shape 36. Processor 24 can utilize software to transform the data received from profilers 20 into electronic and/or physical displays, for example at output device 26. In one example, a 3-D map of the echoes and/or associated Doppler shift to determine parameters such as, but not limited to, streamer depths, sea wave frequency, sea wave amplitudes, the sea surface shape and/or water currents profiles across the streamer spread are displayed.

Processor 24 can be a computer that has processing software executable on one or more central processing units (CPUs). The CPU(s) may be connected to a storage device as well as output device 26. Instructions in software can be loaded for execution on processor 24. Processor 24 includes microprocessors, microcontrollers, processor modules or subsystems (comprising one or more microprocessors or microcontrollers), or other control or computing devices. A "processor" can refer to a single component or to plural components. Data and analysis and transformation instructions can be stored in respective storage devices, which are implemented as one or more computer-readable or computer-usable storage media. The storage media include different forms of memory comprising semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media comprising tape; and optical media such as compact disks (CDs) or digital video disks (DVDs).

Figure 3:
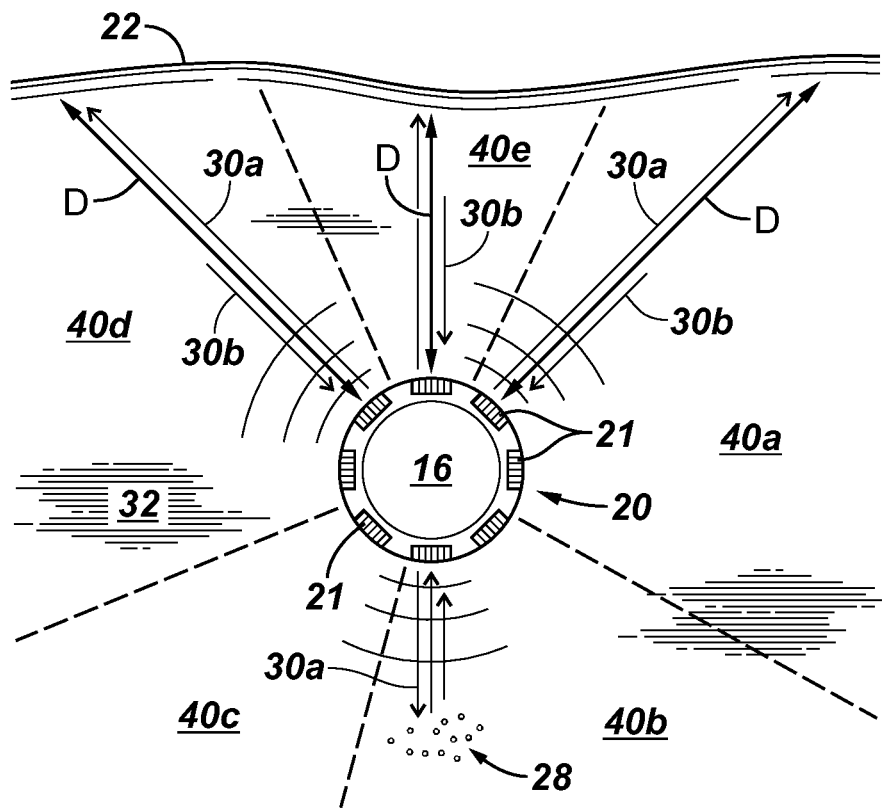
FIG. 3 is schematic end view of an illustrative embodiment of an ultrasonic transducer array profiler according to one or more aspects of the invention.

Refer now to FIG. 3 depicting a cross-sectional view of an illustrative embodiment of a profiler 20 located in a body of water 32. The depicted profiler 20 is carried by a streamer 16; however, profiler 20 may also be disposed at a source 14 as indicated in FIG. 2. An ultrasonic transducer array (e.g., profiler 20) may be formed in various manners and may include, although not illustrated, a power source, a multiplexer, and a processor 24 positioned locally at profiler 20. Profiler 20 may include a transducer chip with one or more piezoelectric layers and electrical connectors passing to each layer.

Figure 3A:
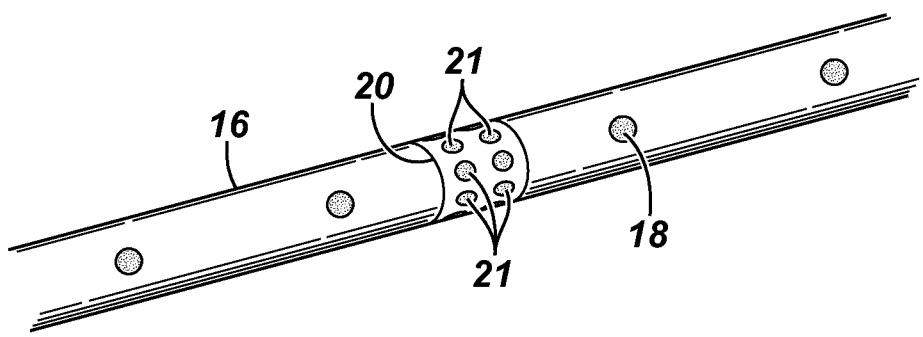
FIG. 3A is a perspective view of an illustrative embodiment of a portion of a streamer carrying a profiler according to one or more aspects of the invention.

In the illustrative embodiment of FIG. 3, profiler 20 is an ultrasonic element array device that includes (e.g., comprises) a plurality of elements 21 that are shown disposed radially about the cylindrically shaped profiler 20. Elements 21 are depicted in FIG. 3A disposed longitudinally, or axially, and radially on profiler 20. In some embodiments, elements 21 include a plurality of independent receivers and emitters. In other embodiments, elements 21 include transducers capable of both emitting and receiving acoustic signals. With reference to transducer elements 21, "receiver" or "emitter"

may be used interchangeably with transducer in reference to the function of the element for the particular operation. Profiler 20 and the array of elements 21 can emit one or more ultrasound signal frequencies. In some embodiments, array of elements 21 can emit directional and/or omni-directional signals and can include directional or omni-directional receivers.

Referring back to FIG. 3, the emitted acoustic signal(s) are identified by the arrows denoted by the numeral 30a and the corresponding echoes, or back-scattered energy, is indicated by the arrows denoted by the numeral 30b. The echo 30b is reflected from the sea surface 22 and by particles 28 in the water body 32. The distance (e.g., range) between profiler 20 and sea surface 22 is indicated, for example by the elapsed time of an echo 30b arrival and/or the associated Doppler shift for a signal.

The Doppler shift of the data from echo 30b is proportional to the velocity of the particles 28 in water 32 and is indicative of the velocity and the direction of the water current relative to profiler 20. The surface currents are those currents occurring at sea surface 22 or approximately within one wavelength of sea surface 22. The underwater currents are those currents in the water current below the surface currents. The surface current as well as the underwater currents may be utilized for streamer 16 steering. In some embodiments, measurements of the current can be used in the sea surface shape determination. For example, the water particles have an elliptical displacement when the swell is propagating. The swell creates a local current at and below the surface which weakens with depth from the surface. Measurement of these sea currents (e.g., local current) can provide information regarding the direction and the amplitude of the swell, which can be used in the sea surface shape determination.

In some embodiments, emitted signal 30a is emitted radially outward from profiler 20 in all or substantially all directions simultaneously. A plurality of echoes 30b will than be recorded at one or more elements 21, as further described herein. The data from the recorded can be indicative of one or more of the distance from the profiler to the sea surface, the distance from discreet locations (e.g., elements 21) on profiler 20 and the sea surface, the incident angle of the echo, the direction of movement of the surface swells, water current velocity, water current direction, the slope of the sea surface, the shape of the sea above the profiler (e.g., the sea surface shape).

In other embodiments, emitted signal 30a is emitted directionally outward in discreet angular directions from profiler 20. FIG. 3 depicts illustrative discreet angular directions, generally denoted by the numeral 40 and individually 40a, 40b, 40c, etc. For purposes of illustration only five angular directions, 40a to 40e, are illustrated by the dashed lines extending radially around profiler 20. Discreet is utilized herein to mean a limited angular range as opposed to an omnidirectional signal 30a. For example, the discreet angular direction may be a selected and particular angle, e.g., vertical incident to the sea surface 22 or vertical relative to the profiler toward the sea surface, or offset from vertical. In another example, the signal may be emitted across an angular range and the measured echoes 30b may be decomposed into distances to sea surface 22 at various incident angles and/or the slope of the sea surface. Profiler 20 may directionally emit signals 30a (e.g., ray) in all or some of some of angular directions 40a, 40b, etc. For example, signals 30a may be emitted sequentially proceeding 360 degrees (or less) around profiler 20. The measured echoes 30b at each step (e.g., directionally emitted signal) can then be decomposed into distances.

Signal 30a transmissions from transducer elements 21 and/or profilers 20 may be time shifted in some embodiments, for example to focus the emitted energy in one given direction while minimizing the energy emitted in other directions. Acoustic signal 30a emissions may be focused by phase steering transducer elements 21. For example, phase steering transducer elements 21 to focus emitted signals 30a angular direction 40a minimizes the energy emitted vertically (e.g., direction 40e) making it simpler to beam form the recorded data to reject reflections 30b from the vertical ray and to determine the distance from profiler 20 (e.g., streamer 16) to a point at sea surface 22 that is in angular direction 40a in this example and is therefore not vertically above streamer 16. Utilizing incident angles that are not directed vertically toward sea surface 22 (e.g., substantially perpendicular to a "flat" sea surface) facilitates determining, for example, the sea surface shape 36 and the slope 34 (FIG. 2) of the sea surface 22 above the profiler. The sea surface slope 34 can be utilized, for example, to interpolate and/or estimate the distances between position(s) on the streamer and the positions on the sea surface and/or to predict the sea surface shape 36 between locally determined sea surface shapes.

It is conceived that profiler 20 will provide high resolution depth and sea surface shape (e.g., wave shape) estimations relative to traditional systems. For example, it is conceived that utilizing profiler 20 and a high frequency signal, for example 200 KHz, will provide a resolution of centimeters on the sea surface at the depths of interest. Utilization of a transducer array facilitates obtaining high resolution depth data and sea surface shapes so that among other tasks, the surface ghost can be identified. As described further herein, profiler 20 provides data regarding, for example, the distance between sea surface 22 and radial points (e.g., elements 21) about profiler 20 (therefore, streamer 16 and/or source 14) which can be utilized to determine and/or estimate the sea surface shape 36. Taking measurements over time as streamer 16 is towed through the water facilitates obtaining a 3-D sea surface shape 36. As noted, in some embodiments, water current information may be obtained and utilized for example for steering streamers 16 and/or determining the position of streamer 16, for example relative to sea surface 22, in time.

The distance from streamer 16 to surface 22 at a point may be determined from the echo returned to element 21 from a signal transmitted from element 21. In one example, the distance "D" may be determined by dividing the range (e.g., the time between transmission and receipt) by 2 and multiplying by the speed of sound in the water. The emitted signal 30a depicted in angular direction 40e (FIG. 3) is referred to generally as being the vertical (e.g., perpendicular) relative to sea surface 22 (assuming the surface is planar) for purposes of illustration. The vertical distance "D" (e.g., depth, local depth) of profiler 20 and streamer 16 can be determined utilizing the range from transmission 30a and echo 30b along vertical incident 40e. By transmitting signals 30a and receiving echoes 30b at angles incident to vertical (e.g., non-vertical) relative to the sea surface 22, for example in angular directions 40a and 40d depicted in FIG. 3, the distance "D" (e.g., non-vertical distance) along the non-vertical incident angles can be determined from the received echoes 30b. The distances "D" can be used to describe the sea surface shape 36 above streamer 16, in particular, the local (e.g., determined, measured) sea surface shape 36 above streamer 16 and centered on profiler 20.

The available incident angles may be limited by the deterioration of the return signal (e.g., echo 30b). However, the sea surface shape 36 along about a 23 meter section centered on a profiler 20 of streamer 16 may be determined for example if a distance "D" at a 30 degree incident angle from vertical can be measured at a local streamer distance (e.g., depth) "D" of 20 meters. If sea surface 22 is not flat, echoes 30b will be received at varying times. Utilizing the vertical distance "D" (e.g., local depth) between sea surface 22 and profiler 20, the non-vertical distance "D" to a "flat" sea surface 22 at a non-vertical incident angle may be estimated. The 3-D sea surface shape may be determined by repeating the process over time and as profiler 20 is towed through the water.

Figure 4:
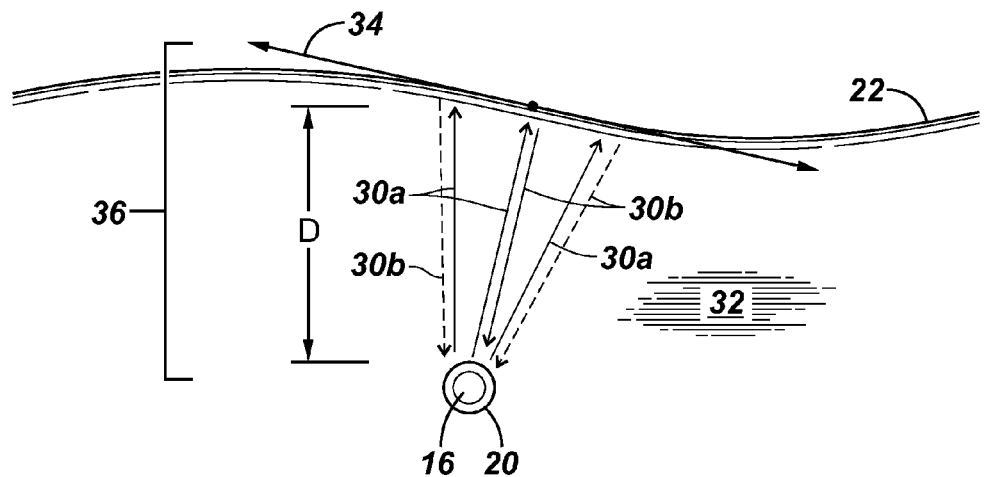
FIG. 4 is a schematic end view of streamer and profiler according to one or more aspects of the invention.

A method for determining a local sea surface slope 34 (e.g., gradient) above a streamer according to one or more aspects of the present disclosure is now described with reference to FIG. 4. FIG. 4 is an end view of a single streamer 16 comprising a profiler 20. Transmission signals 30a are transmitted from profiler 20 toward sea surface 22 at various incident angles. The amplitude of the echoes 30b from signals 30a (e.g., rays) for the different incident angles (see FIG. 3) of the received echoes 30b are compared. The echo 30b which is substantially perpendicular, e.g., vertical, to sea surface 22 will have the highest amplitude. In the example depicted in FIG. 4, the middle signal 30a is depicted as being substantial perpendicular to sea surface 22, and the vertical echo 30b depicted by the solid line has a higher amplitude than the non-vertical incident angle echoes 30b which are depicted in FIG. 4 by dashed lines. The distance between profiler 20 and a position on sea surface 22 can be determined utilizing the echo 30b arrival time as a function of the incident angle to the position on sea surface 22. For example, distance "D" depicted in FIG. 4 represents the vertical distance, e.g., the local depth, of streamer 16 at profiler 20 as determined from the arrival time of vertical echo 30b. Similarly, the non-vertical distances can be determined utilizing the arrival echoes 30b, depicted by the dashed lines. A sea surface slope 34 above profiler 20 (e.g., local sea surface slope) can be determined utilizing the measured echo 30b arrival times as a function of the incidence angles. The local determined sea surface slope 34 above profilers 20 can be utilized to better interpolate (e.g., predict, reconstruct) the sea surface shape 36 between profilers 20 and the locally determined sea surface shape above the profilers. For example, in FIG. 4, the local sea surface slope 34 is depicted in a direction perpendicular to the depicted streamer 16 and may therefore be more beneficial for predicting and/or reconstructing the sea surface shape between adjacent parallel streamers 16 as described with reference to FIG. 5 below. According to one or more aspects of the invention, sea surface shape 36 and the 3-D sea surface shape 36, can be determined and predicted in real time while conducting a survey. According to one or more aspects of the invention, the sea surface shape 36 and/or 3-D sea surface shape can determined and predicted post-survey. As described herein and as will be understood by those skilled in the art with the benefit of this disclosure, the data measured, determined and interpolated can be utilized for various tasks including without limitation steering the survey (e.g., streamers 16) and deghosting the seismic data obtained.

Figure 5:
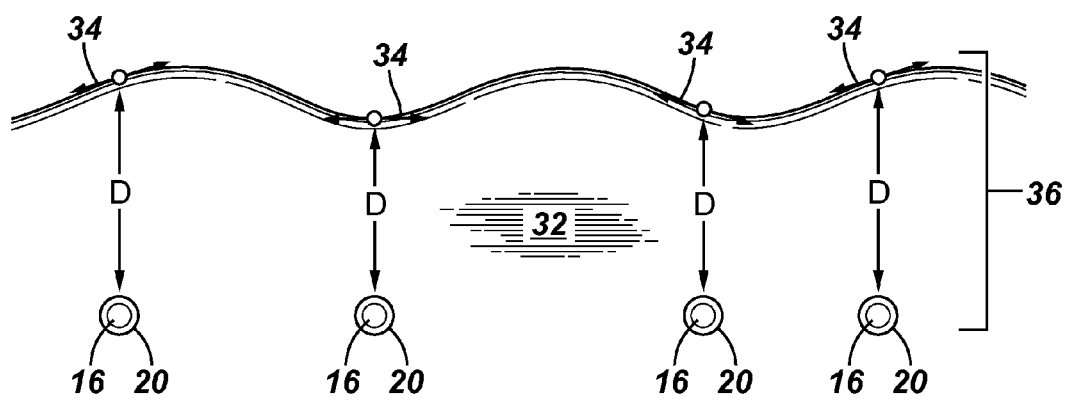
FIG. 5 is a schematic end view of a spread of seismic streamers and profilers according to one or more aspects of the invention.

FIG. 5 depicts four streamers 16, each having at least one profiler 20, along a lateral line of a seismic survey 10 (see FIG. 1). At each streamer 16, the local streamer depth, depicted vertical distance "D" (e.g., the sea height at the streamer) and the local sea surface slope 34 above the streamer is determined, for example as described with reference to FIG. 4. Depicted in FIG. 5, the local sea surface slopes 34 are oriented perpendicular to the parallel streamers 16. The determined local vertical distances "D" and the determined local vertical slopes 34 at the depicted adjacent profilers 20 can be utilized to interpolate (e.g., predict) the sea surface shape 36 between the adjacent profilers 20 and streamers 16 and therefore across the survey area.

Figure 6:
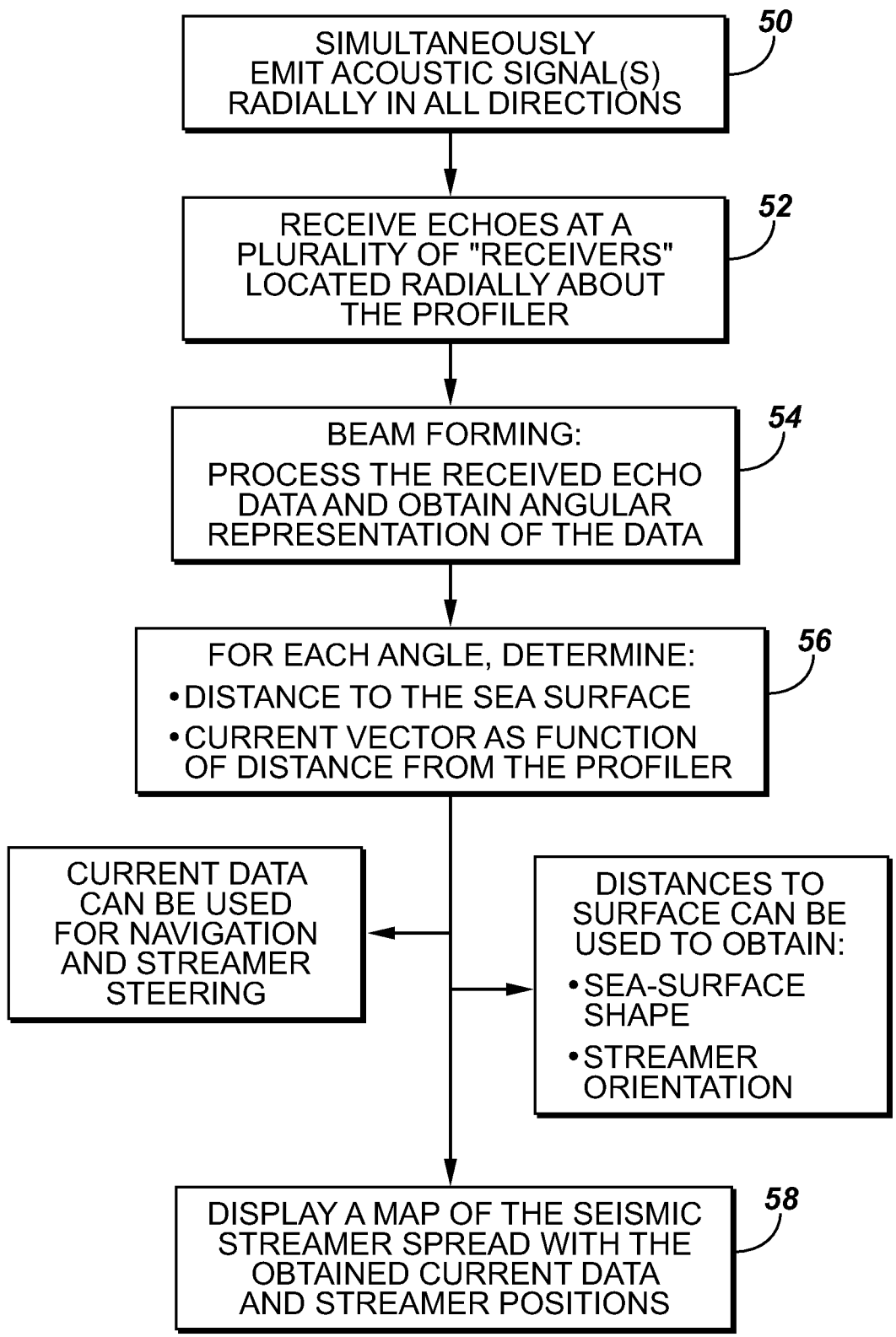
FIG. 6 is a block diagram of an illustrative embodiment of a method of obtaining, and utilizing, marine seismic survey data.

Refer now to FIG. 6, wherein an illustrative embodiment of a method of obtaining marine seismic survey data is described with reference back to FIGS. 1 to 5. In this example, a high frequency acoustic signal, for example 15 to 250 kHz, at one or several frequencies is emitted in all radial directions from profiler 20 substantially simultaneously (step 50). Echoes 30b are received at a plurality of transducer elements 21 spaced radially about profiler 20 (step 52). Echoes 30b may be received from a transducer element 21 that emitted the signal and other transducer elements 21. The received echoes 30b and Doppler shift may then be processed and analyzed (steps 54, 56) to determine, for example and without limitation to, distance "D" from one or more radial points about profiler 20 to sea surface 22 and/or water current vectors as functions of distance from the profiler. For example, Doppler shifted echoes may be beam formed and decomposed to determine distances and water current vectors. The water current data may be utilized for example for steering vessel 12 and streamers 16 to avoid feathering. Distances "D" between sea surface 22 and profilers 20 at the various incident angles may be utilized to determine the shape, or 3-D shape, of the sea (e.g., sea wave shape, sea surface shape, roughness shape or spectrum) above the streamers 16 and the slope 34 of the sea surface for example. Determination of the distances "D" from radial points about profiler 20 carried by a streamer 16 and sea surface 22 can also be utilized to identify the orientation or rotation of streamer 16 relative to the sea surface as well.

The water current data can be utilized, for example, for navigation and to steer streamers 16. Distances "D" between positions on streamer 16 (e.g., profilers) and positions on sea surface 22 can be utilized in interpreting the seismic data (e.g., deghosting) and for maneuvering the streamers. Further, the water current data obtained, equipment depths, streamer orientations, and sea surface shape 36 can be transformed and provided as a map of the streamer spread (step 58). In particular, the data and information obtained from the plurality of profilers 20 dispersed across the survey spread can be compiled to provide a 3-D map of the survey spread in real time. For example, the sea surface shape 36 can be determined for approximately a 23 meter diameter area above a profiler 20 that is at a vertical distance "D" (e.g., local depth) of 20 meters and that can measure a non-vertical distance "D" to sea surface 22 at an incident angle of 30 degrees from vertical. As streamer 16 is towed (e.g., at 2.0 to 2.5 m/s) a plurality of these measurements at profiler 20 are obtained. Utilizing the measurements, desirably obtained by more than one profiler 20 on more than one streamer 16, a 3-D sea surface shape 36 may be determined across the survey area (e.g., streamer spread). Sea surface slope 34 of sea surface 22 may be determined, in one example, by comparing the distance between sea surface 22 and streamer 16 in various directions (e.g., incident angles). The local sea surface slope 34 and vertical depths of the profilers 20 can be utilized to interpolate the sea surface shape 36 between the profilers 20 and/or streamers 16 (e.g., between the determined local sea surface shapes).

FIG. 7 is an illustrative embodiment of another method of obtaining marine seismic survey data, described with reference to FIGS. 1 to 5. In this embodiment, an acoustic signal 30a is emitted (step 50) in one discreet angular direction (e.g., vertically in angular direction 40e, offset from vertical (e.g., incident to vertical) in angular directions 40a and 40d). Echo(es) 30b are then received (step 52) at one or more of the profiler transducer elements 21 and profilers 20. Steps 50 and 52 may then be repeated in sequential radial steps (e.g., sequential discreet angular directions, incident angles) around profiler 20. Sequential steps may comprise providing time shifts between the individual transducer elements 21 to focus the emitted energy in one given angular direction while minimizing the energy emitted in the other directions (e.g., focusing phase steering of the plurality of transducer elements 21). Emitting signal 30a in a first angular direction and recording the data at a plurality of receiving elements 21 and then emitting signal 30a in a different angular direction and recording its echoes 30b facilitates decomposing the data into distances "D" to the sea surface as a function of incident angles. The sequential steps of emitting directional signals 30a may comprise proceeding along sequential radial (e.g., angular) steps around a portion of profiler 20 or proceeding between non-sequential angular directions. It is recognized that the signals may not be emitted 360 degrees around profiler 20. For example, to determine sea surface shape 36, it may be desired to limit the emitted signals 30b to an angular range about the profiler.

In another example, profiler 20 emits a directional acoustic signal, for example, via phase steering. Profiler 20 (e.g., a directional receiver) detects echoes 30b coming back from the same direction. Performing this step in the vertical direction (e.g., toward sea surface 22), the local distance "D" between sea surface 22 and streamer 16 may be obtained (e.g., range divided by 2 times the water sound velocity). This distance (e.g., depth) may be utilized for deghosting the seismic data as desired. Emitting signals 30a at different incident angles from vertical may provide distances (e.g., non-vertical) between sea surface 22 and streamer 16 that may be used to determine the sea surface shape 36 and/or the sea surface slope 34 (e.g., see FIGS. 4 and 5), and repeated measurements over time as streamers 16 are towed can provide a 3-D sea surface shape 36.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method for determining a sea parameter, the method comprising:
   simultaneously emitting an acoustic signal approximately 360 degrees from a profiler positioned below a sea surface;
   receiving an echo of the emitted signal at a plurality of receiving elements located radially about the profiler;
   obtaining an angular representation of the received echo data at the radially located receiving elements, the angular representation comprising incident angles relative to the profiler; and
   determining a parameter from the recorded data, the parameter comprising a distance between the profiler and the sea surface for each of the incident angles, wherein the incident angles comprise one or more non-vertical incident angles.

2. The method of claim 1, further comprising transforming the parameter into a sea surface shape.

3. A marine seismic survey method, the method comprising:
   towing at least two streamers below a sea surface forming a survey spread, each streamer comprising a survey sensor and a cylindrically shaped profiler, wherein the profiler comprises a plurality of receiver elements located radially about the profiler;
   emitting an acoustic signal from the profiler;
   receiving an echo of the emitted signal at the profiler;
   obtaining an angular representation of the received echo data, the angular representation comprising incident angles relative to the profiler; and
   determining a parameter from the received echo, the parameter comprising a distance between the profiler and the sea surface for each of the incident angles, wherein the incident angles comprise one or more non-vertical incident angles.

4. The method of claim 3, further comprising transforming the parameter into a sea surface shape above the survey spread.

5. The method of claim 3, wherein the profiler is an ultrasonic transducer array comprising a plurality of transducer elements.

6. The method of claim 3, wherein the emitting comprises simultaneously emitting the acoustic signal approximately 360 degrees about the profiler.

7. The method of claim 6, wherein the receiving the echo comprises receiving the echo at the plurality of receiving elements located radially about the profiler.

8. The method of claim 6, further comprising transforming the parameter into a sea surface shape above the survey spread.

9. The method of claim 6, comprising deghosting seismic data acquired with the survey system utilizing the determined parameter.

10. The method of claim 3, wherein the emitting the acoustic signal comprises emitting the acoustic signal in a discreet angular direction offset from vertical relative to the profiler.

11. The method of claim 10, further comprising transforming the parameter into a sea surface shape above the survey spread.

12. The method of claim 10, further comprising deghosting seismic data acquired with the survey system utilizing the determined parameter.

13. The method of claim 3, comprising deghosting seismic data acquired with the survey system utilizing the determined parameter.

14. A method for determining a sea parameter, the method comprising:
   emitting an acoustic signal from a profiler below a sea surface, the acoustic signal emitted in a discreet angular direction offset from vertical relative to the profiler;
   receiving an echo of the emitted signal at a plurality of receiver elements located radially about the profiler;
   obtaining an angular representation of the received echo data at the radially located receiving elements, the angular representation comprising incident angles relative to the profiler; and determining a distance between the profiler and the sea surface for each of the incident angles, wherein the incident angles comprise one or more non-vertical incident angles.

15. The method of claim 14, further comprising transforming the parameter into a sea surface shape.

* * * * *